United States Patent [19]

Jeromin et al.

[11] Patent Number: 4,676,953
[45] Date of Patent: Jun. 30, 1987

[54] CONTINOUS PRODUCTION OF SODIUM SILICATE SOLUTIONS

[75] Inventors: Lutz Jeromin, Hilden; Heinrich Krings, Erkrath; Dieter Legel, Haan; Rudolf Novotny, Duesseldorf; Harald Skrobek, Langenfeld, all of Fed. Rep. of Germany

[73] Assignee: Henkel Kommanditgesellschaft auf Aktien, Duesseldorf, Fed. Rep. of Germany

[21] Appl. No.: 748,297

[22] Filed: Jun. 24, 1985

[30] Foreign Application Priority Data

Jun. 29, 1984 [DE] Fed. Rep. of Germany ....... 3423945

[51] Int. Cl.$^4$ .............................. B01F 5/02; B01J 8/10
[52] U.S. Cl. ..................................... 422/106; 422/113; 422/140; 422/145; 422/147; 422/227; 422/230; 422/234; 423/332
[58] Field of Search ................................ 422/231–235, 422/106, 111, 112, 113, 139–147, 227; 423/332, 333; 23/313 FB; 34/57 A

[56] References Cited

U.S. PATENT DOCUMENTS

| 2,606,144 | 8/1952 | Leffer .................................. 422/146 |
| 2,789,034 | 4/1957 | Swaine et al. .................. 23/313 FB |
| 2,885,272 | 5/1959 | Kimberlin, Jr. et al. ........... 422/140 |
| 3,290,241 | 12/1966 | Wickham et al. .................... 422/144 |
| 3,884,645 | 5/1975 | Kinne .................................. 423/333 |
| 4,371,501 | 2/1983 | Vickers .............................. 422/146 |

FOREIGN PATENT DOCUMENTS

| 3121669 | 5/1981 | Fed. Rep. of Germany . |
| 3002834 | 7/1981 | Fed. Rep. of Germany . |
| 2179573 | 4/1972 | France . |
| 461013 | 2/1937 | United Kingdom . |
| 2119779 | 11/1983 | United Kingdom . |

OTHER PUBLICATIONS

Chemical Abstract 99:40620c—Videnin S. A., et al.

Primary Examiner—Michael S. Marcus
Attorney, Agent, or Firm—Ernest G. Szoke; Henry E. Millson, Jr.; Mark A. Greenfield

[57] ABSTRACT

An apparatus for the continuous production of clear sodium silicate solution with an SiO$_2$:Na$_2$O weight ratio of 1–2.8:1 by fusing sand in aqueous sodium hydroxide using a pressure-sealed circulating suspension reactor having an upper portion comprising a partially tapered gravity thickener and a lower portion comprising a cylindrical jet loop mixer. The jet loop mixer has a concentric cylindrical insertion tube suspended therein, and a recirculating power jet nozzle is upwardly directed through the bottom of the jet loop mixer so that its stream is directed into the lower end of the insertion tube, causing a continuous circulation flow.

21 Claims, 2 Drawing Figures

CONTINOUS PRODUCTION OF SODIUM SILICATE SOLUTIONS

BACKGROUND OF THE INVENTION

1. Field of the Invention

This invention relates to an improved process for the continuous production of sodium silicate solutions under high pressure and at elevated temperature and to an apparatus for carrying out this process.

2. Statement of the Related Art

Of the alkali metal silicate solutions known as waterglass, sodium silicate solutions, generally called soda waterglass, are the most frequently used for commercial purposes. Soda waterglasses normally have a solids content of approximately 35% by weight and a weight ratio of $SiO_2:Na_2O$ of 3.3–3.4:1. Soda waterglasses are industrially produced by fusing quartz sand and soda in suitable furnaces at temperatures in the range 1,400° to 1,500° C. with evolution of $CO_2$. In another process step, the melt which solidifies on cooling, i.e., "lump glass", is dissolved in water under pressure at elevated temperature and the solution obtained is optionally filtered, depending on the quality requirements. By mixing solutions such as these with sodium hydroxide, it is possible to obtain sodium silicate solutions characterized by a lower weight ratio of $SiO_2$ to $Na_2O$. However, this process is very expensive both in terms of plant and in terms of the energy required.

Another possible method of obtaining soda waterglasses comprises fusing sand hydrothermally with aqueous sodium hydroxide. By this process, it is possible to obtain sodium hydroxide solutions having a $SiO_2$:$Na_2O$ weight ratio of up to 2.8:1. The reaction vessels normally used for hydrothermal syntheses of this type are cylindrical, nickel-lined iron autoclaves which are either mounted for rotation about their horizontal axis or are provided with suitable stirrers to ensure adequate intermixing of the sand/sodium hydroxide suspension. However, this process is attended by disadvantages insofar as, previously, it has not been possible to carry out the process continuously and very long reaction times are necessary to obtain complete conversion of the sand when it is used at moderate, industrially practicable temperatures. In addition, to obtain as large a sand/sodium hydroxide reaction interface as possible, it is important to use a large excess of sand, of which only part dissolves during the reaction and which puts up a high inertial resistance to the stirrers. This resistance as well as the rubbing of the sand against the blades of the stirrers produce serious wear. In addition, separation of the excess sand and purification of the sodium silicate solution formed necessitates subsequent filtration using settling filters and filter aids. This is also expensive and not without problems.

Published German patent application No. 30 02 834 which is commonly assigned with this invention and has some coinventors in common, describes a fluidized bed process for the hydrothermal production of sodium silicate solutions in a static reaction vessel, in which the liquid phase of the reaction mixture is pump-circulated at relatively higher temperatures (150°–250° C.) and pressures through a sand bed introduced into a static reaction vessel (4) and also through a bypass pipe (5) arranged outside the vessel until the concentration of $SiO_2$ in the liquid phase has reached the desired level. This process is attended by the disadvantage that, in the static reaction vessel which tapers downwards like a funnel and into which the liquid phase of the reaction mixture is pumped in from below, a large part of the sand accumulates in the vicinity of the liquid inlet and on the "funnel" surfaces and only a narrow, upwardly widening reaction zone is formed, in which adequate contact between solid sand and the alkaline reaction solution is achieved as a result of thorough mixing by the pumped-in solution. Accordingly, high temperatures and pressures and comparatively long reaction times are required to reach the desired concentration of $SiO_2$ in the liquid phase. In the event of a fault in the plant, for example through failure of the liquid feed pump, this narrow reaction zone is also immediately blocked by sedimenting sand and the solid sand/waterglass cake has to be mechanically removed at considerable expense.

Published German patent application No. 31 21 669, which is commonly assigned with this invention and has an inventor in common, describes another continuous process for carrying out heterogeneous reactions involving solid, granular components in a vertical reaction vessel, in which the reaction mixture is fed into the reactor from below against the pressure preferring in the reactor. Uniform dispersion of the various reaction components, particularly the granular reactants, is said to be obtained by mechanical fittings installed in the reaction vessel, for example in the form of perforated plates through which the reaction mixture is forced. Reactors constructed in this way may also be used for hydrothermal reactions for the production of alkali metal silicate solutions, but are attended by the disadvantage that the perforated plates mentioned very quickly become blocked by the reaction component, sand, and are thus unable to contribute towards adequate mixing of the reactants.

Another process for the production of alkali metal silicate solutions in a static reactor is described in published British patent application No. 2,119,779 according to which an aqueous alkali hydroxide solution, preferably a sodium hydroxide solution, is reacted with silicon dioxide in the form of coarse sand in a vertical tubular reactor in which no mechanical agitation takes place. The alkaline solution is fed into the reactor from above, while clear alkali metal silicate solutions can be run off from the bottom of the reactor. The disadvantage of this process is that the alkaline solution only dissolves the sand successively and sand particles decreasing in size cake together, even under the pressure of the flowing solution, to form a solid cake of quartz powder which increases resistance to flow and thus impedes the throughflow of the solution. Another disadvantage is that insoluble impurities remain in the reactor because the sand bed acts as a filter.

SUMMARY OF THE INVENTION

The present invention overcomes the disadvantges of state-of-the-art processes. In achieving this, the present invention starts from the knowledge that the production of sodium silicate solution by a hydrothermal process has ideal qualifications for continuous working because large quantities of a "mono"-product, i.e. a product of consistent, uniform composition, have to be produced. Although the rate of dissolution, i.e. reaction, of the sand in solutions of NaOH is comparatively high at temperatures above 200° C., it may be assumed that the dissolution rate may be further improved in a continuous dissolving process by using an excess of sand and providing for better mixing of the suspension compared with a rotating drum process. This should also provide for more economic operation.

The present invention thus relates to a process for the continuous hydrothermal production of sodium silicate solutions having a weight ratio of $SiO_2:Na_2O$ of 1-2.8:1 by fusing sand in aqueous sodium hydroxide solutions under hydrothermal conditions. A continuously delivered suspension of unground quartz sand in a suitable suspending medium is continuously reacted with continuously delivered aqueous sodium hydroxide solution having an $Na_2O$ content of from 10 to 40% by weight at temperatures of from 150° to 250° C. and under pressures of from 5 to 40 bar. The reaction is conducted in a circulating-suspension reactor consisting of a jet loop mixer comprising a coaxially arranged insertion tube, which (in addition to at least one power jet nozzle at the base of the container) comprises at least one tangential nozzle near the base, a gravity thickener surmounting the jet loop mixer and a circulation pipe leading from the head of the gravity thickener via a pump to the above-mentioned nozzles. A component stream of the sodium silicate solution being formed is continuously run off from the head of the gravity thickener, (which acts as a clarifier) circulated by a pump and returned to the suspending apparatus through the power jet and tangential nozzles arranged at the base of the reactor. As a result, the reaction components are thoroughly mixed. At the same time part of the sodium silicate solution, in which the weight ratio of $SiO_2:Na_2O$ has reached a value of 1-2.8:1, is continuously run off from the head of the gravity thickener through an outlet pipe in a quantity corresponding to the quantities introduced. Part of the heat present in the solution is recovered by means of a heat exchanger, after which the solution is relaxed to ambient pressure and any undissolved reaction components are filtered off by methods known per se.

The invention also relates to an apparatus for carrying out this process.

Other than in the operating examples, or where otherwise indicated, all numbers expressing quantities of ingredients, reaction conditions, or defining parameters used herein are to be understood as modified in all instances by the term "about".

BRIEF DESCRIPTION OF THE DRAWINGS

The process and apparatus according to the invention are described in more detail in the following with reference to the accompanying diagrammatic drawings, wherein.

DETAILED DESCRIPTION OF THE INVENTION

Figure 1:
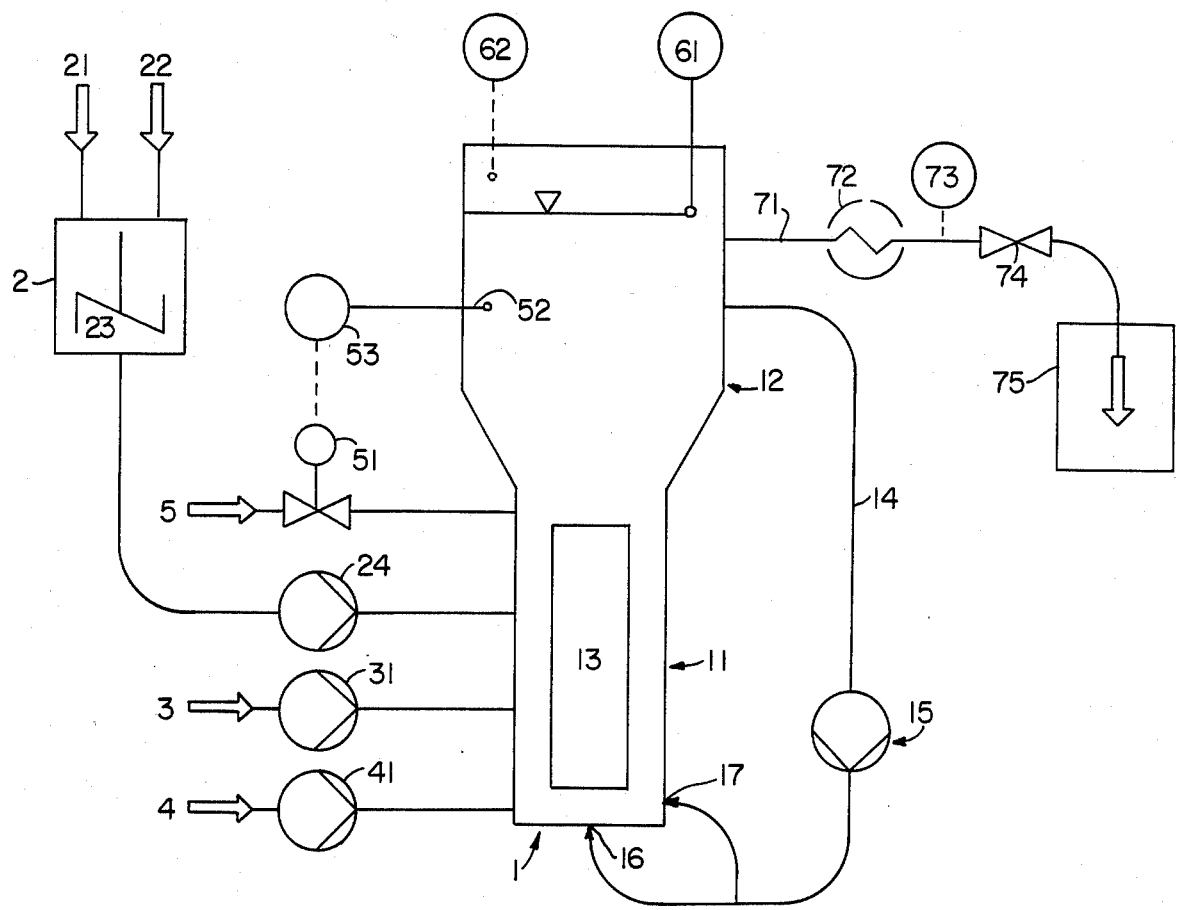
FIG. 1 shows a reactor for carrying out the process including all receivers, metering units and measuring instruments.

The most important objective of the process is to obtain as high a volume/time yield as possible in the reaction of the quartz sand with the sodium hydroxide solution. To achieve this objective, it is necessary to have as high a solids content in the solution as possible so as to create as large as possible a surface suitable for the reaction, based on the reactor volume, and, by providing suitable apparatus, to ensure that all the reaction components are thoroughly mixed.

To achieve this objective, a circulating-suspension reactor 1 is used for the process according to the invention, consisting of a jet loop mixer 11 as the suspending apparatus surmounted by a gravity thickener 12 with a conically shaped or tapered lower part as clarifier. Components of the jet loop mixer include a cylindrical, pressure-tight jet loop mixer container 11, an insertion tube 13 arranged or suspended coaxially in the jet loop mixer 11, at least one upwardly directed power jet nozzle 16 arranged in the base of the reactor 1 and preferably at least one tangential nozzle 17 arranged near the base and directed parallel thereto and tangentially of the reactor wall. A recirculation conduit 14 leading through a recirculating pump 15 connects the head of the gravity thickener 12, (i.e. a zone in which the solution is adequately clarified), to the above-mentioned nozzles 16 and 17. The reactor as a whole is in the form of a pressure vessel and consists of nickel-lined steel or of high-nickel content steel. All pipes which come into contact with the hot, strongly alkaline solutions also consist of high-nickel content steels.

The power jet nozzle 16 generates an intensive flow of liquid from the bottom of the reactor upward through the insertion tube 13 to the upper part of the reactor. As a result, reaction components situated between the outer reactor wall and the insertion tube 13 are simultaneously drawn toward the bottom of the reactor and driven through the insertion tube into the upper part of the reactor. This circulation through the insertion tube 13 initiates intensive mixing of all the reaction components.

This effect is supported by the flow of the suspension initiated by the at least one annularly arranged tangential nozzle 17. Another function of the at least one tangential nozzle 17 is completely to redisperse the solid reaction components settling on the bottom of the reactor in the event of any interruptions in the operation of the reactor. In this way the reactor can be put back into operation after a stoppage, without the extremely difficult removal of the reaction mass.

The sand is delivered in the form of a suspension to the circulating-suspension reactor 1 by a sand feed pump 24. Primarily moist unground quartz sand containing at least 96% $SiO_2$ and having an average grain size of 0.3 mm may be preferably used for such sand.

In a suitable suspending unit 2 equipped with a stirrer 23, the sand introduced at 21 is mixed with a suspending liquid introduced at 22 and the resulting mixture delivered to the reactor by the feed pump 24, preferably to the upper half of the jet loop mixer 11. The suspending liquid used may be water, an aqueous sodium hydroxide solution or even a waterglass solution. However, it is also possible to use other suspending liquids whose presence does not interfere with the reaction under the reaction conditions described above. It is preferred to use a sodium hydroxide solution.

In addition, sodium hydroxide solution 3 and fully deionized (D.I.) water 4 are delivered to the reactor 1 through sodium hydroxide pump 31 and D.I. pump 41, respectively, preferably to the lower third of the jet loop mixer 11. Aqueous sodium hydroxide solutions suitable for the process include preferably 50% sodium hydroxide having an $Na_2O$-content of 38.7%. However, it is also possible to use dilute sodium hydroxides (down to 10% and up to 40% by weight of $Na_2O$) which replace part of the 50% sodium hydroxide.

The quantities of 50% sodium hydroxide used for carrying out the described process are gauged to the quantity of sand introduced and to the desired composition of the final waterglass. The quantity of D.I. water is also gauged to the quantity of sand introduced and to the desired composition of the waterglass.

Figure 2:
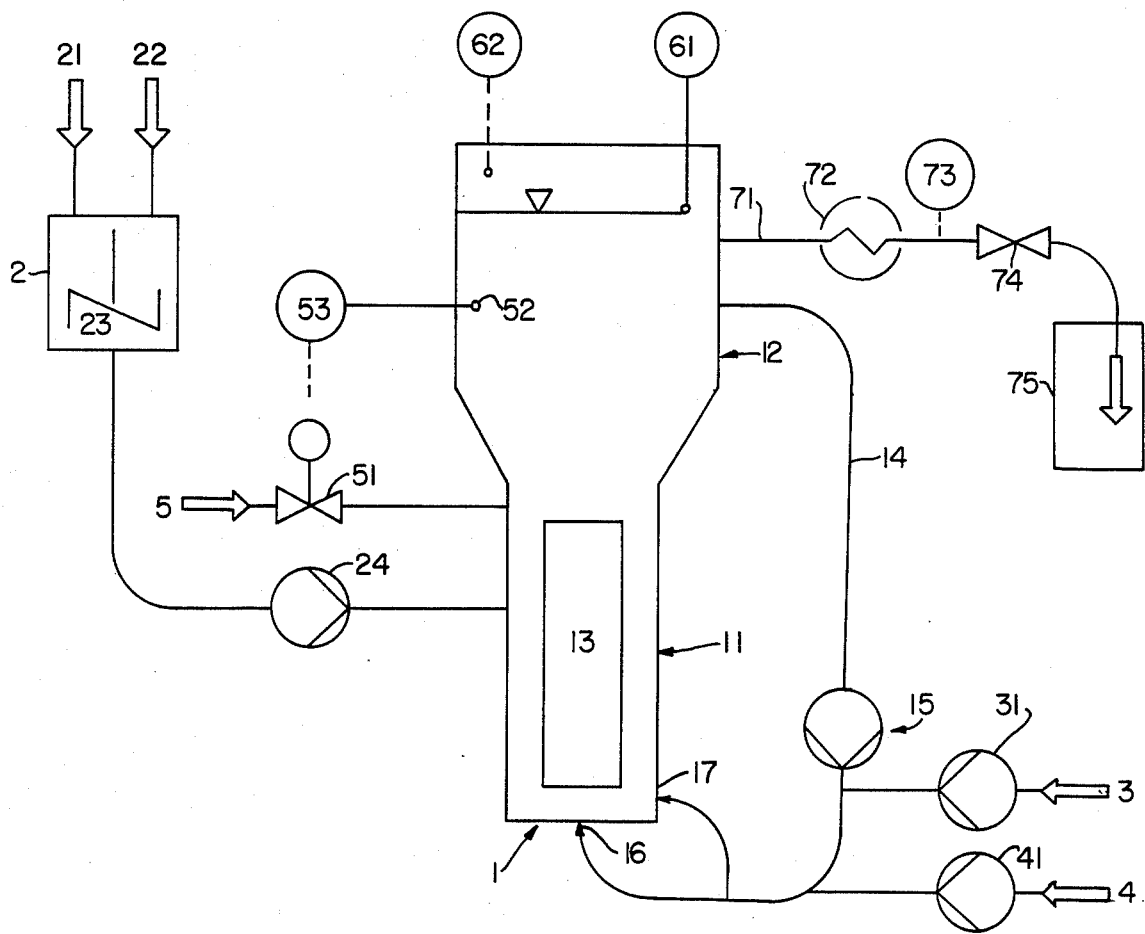
FIG. 2 shows a preferred embodiment of the reactor suitable for carrying out the process in which two of the reaction components are fed into the mixing circuit.

In one preferred embodiment of the process according to the invention, which is illustrated in FIG. 2, the sodium hydroxide and fully deionized water in particular are added to the stream of liquid which is in circulation outside the reactor at a point along the circulation pipe 14 downstream of the circulation pump 15. One advantage of this embodiment is that the hydroxide is immediately thoroughly mixed and diluted. This eases corrosion problems.

The reactor is heated to reaction temperatures of 150° to 250° C. by the direct injection of steam 5. The steam is introduced into the space between the reactor tall and the insertion tube 13, preferably to the upper half of the jet loop mixer 11, because the steam is able to dissolve completely in the downwardly directed stream before the reaction mixture reaches the upward stream initiated by the upwardly directed nozzle 16 in the interior of the insertion tube 13. As a result steam bubbles are not able to interfere with the pulse exchange between the power jet 16 and the circulating stream. The quantity of steam introduced depends on how well the reactor is insulated and how much sodium silicate solution the process produces. The quantity of superheated steam may readily be controlled by continually measuring the temperature of the reaction solution through a temperature sensor 52 and opening or closing the steam valve 51 through a temperature regulator 53 as needed. In this way, the temperature can be kept constant within narrow limits.

A manometer 62 indicates the pressure prevailing in the reactor 1. Instead of regulating the temperature through the temperature sensor 52 and the steam (regulatory) valve 51, it is also possible to use a pressure regulating system, since the reactor 1 is closed. Thus, the manometer 62 may be operatively connected to a pressure relief means (not shown), which lowers the temperature by lowering the pressure, in known manner.

The level of liquid in the reactor 1 may be kept constant by means of a level governor 61 which thus regulates the amount of product solution flowing off in accordance with the inflow of reaction components. In this connection, the inflow is regulated in such a way that the reactants have a residence time in the reactor of 10 minutes or longer, depending on the working temperature.

The reaction components are reacted at working temperatures of 150° to 250° C. and under pressures of 5 to 40 bar. The average solids concentration (quartz sand) in the jet loop mixer 11 of the reactor is adjusted to greater than 15% by volume.

A sodium silicate solution in which the weight ratio of $SiO_2:Na_2O$ is 1–2.8:1 may be continuously removed from the circulating-suspension reactor 1 through an outlet pipe 71. This solution has to be cooled and relaxed to ambient pressure. In one preferred procedure, which is shown in FIGS. 1 and 2, the solution flowing off through the outlet pipe 71 is cooled to a temperature of from 90° to 105° C. in a heat exchanger, regulated by a temperature control 73. The heat liberated during cooling may be used to heat one of the starting components, prefereably the sodium hydroxide.

The cooled waterglass solution is then expanded to ambient pressure by means of a relief valve 74.

In one preferred embodiment of the process according to the invention, the waterglass solution may even be directly expanded without a preliminary cooling step. In this case, the steam given off during expansion is used for directly heating the starting components, which should be taken into account in the delivery of the corresponding starting component. In this preferred case, expansion is advantageously carried out in several stages.

In some cases, the waterglass solution flowing off from the circulating-suspension reactor 1 still contains small quantities of undissolved quartz sand and other undissolved impurities. These undissolved fractions are separated off in a subsequent filtration step using suitable filters 75 known per se, so that a purified, clear sodium silicate solution is obtained.

The principle underlying the described process using the reactor arrangements diagrammatically illustrated in FIGS. 1 and 2 is to introduce the suspending energy into a circulating stream of the clarified, solids-free reaction solution in the interests of reducing wear. The process according to the invention may be embodied in various ways without departing from this basic concept. Thus, the gravity thickener 12 may optionally include fittings, for example along the lines of a disc-type thickener. To improve further the separation of ultrafine sand particles, the outlet into the circulation pipe 14 may optionally be preceded by candle filters or hydrocyclones.

The invention is illustrated by the following Example.

EXAMPLE

The following streams of material were continuously delivered to the circulating-suspension reactor illustrated in FIG. 1:

1. Moist unground quartz sand in a quantity of 320 kg.$h^{-1}$ mean grain size 0.3 mm (maximum grain size 0.9 mm) moisture content 3.7%, day $SiO_2$ content 99.7%.

2. 50% sodium hydroxide in a quantity of 395 kg.$h^{-1}$ $Na_2O$-content 38.7%.

3. Fully deionized water in a quantity of 285 kg.$h^{-1}$, 185 kg.$h^{-1}$ of the water being used to suspend the sand and being delivered to the reactor together with the sand.

4. Superheated steam in a quantity of 200 kg.$h^{-1}$ temperature 210° C.

The temperature prevailing in the reactor was 205° C. and was kept constant by the introduction of superheated steam. The pressure prevailing in the reactor was 15 bar.

The sodium silicate solution continuously flowing off was cooled to around 50° C. in the heat exchanger and subsequently expanded to ambient pressure.

Chemical analysis of the product solution produced the following values:

$SiO_2$ content: 25.38%.

$Na_2O$ content: 12.71%.

Weight ratio of $SiO_2$ to $Na_2O$, 2.0:1. It may be noted that the calculated weight ratio of the starting materials (as $SiO_2$ and $Na_2O$) was 2.08:1. Thus, the weights of starting materials (calculated as $SiO_2$ and $Na_2O$) are in simple 1:1 ratio to the $SiO_2:Na_2O$ weight ratio of the sodium silicate solution product.

The product still contained small quantities of very fine quartz sand and insoluble impurities emanating from the sand, which were removed by filtration using a settling filter. A clear sodium silicate solution was obtained.

We claim:

1. An apparatus for the continuous production of clear sodium silicate solution with an SiO$_2$:Na$_2$O weight ratio of about 1–2.8:1 by fusing sand in aqueous sodium hydroxide solution at a temperature of about 150°–250° C. and a pressure of about 5–40 bar, comprising:
   (a) a vertical pressure-sealed circulating suspension reactor having an upper portion comprising a gravity thickener which is partially tapered at its bottom connecting end, connected to a top of a lower portion comprising a cylindrical jet loop mixer having a bottom end, said lower portion having a cylindrical insertion tube open at its top and bottom ends suspended concentrically therein;
   (b) continuous circulation flow generation means comprising at least one first power jet nozzle, which nozzle is positioned below said jet loop mixer at a point capable of directing a stream upward through the bottom end of said jet loop mixer and through said insertion tube;
   (c) means for introducing a sand suspension directly into an upper half of said jet loop mixer;
   (d) means for introducing an aqueous sodium hydroxide solution into a lower third of said jet loop mixer;
   (e) means for introducing deionized water into a lower third of said jet loop mixer;
   (f) means for introducing steam directly into an upper half of said jet loop mixer;
   (g) means for removing a partial reaction product from a middle section of said gravity thickener and recirculating said partial reaction product back into said reactor through said at least one first jet nozzle; and
   (h) means for removing a completed reaction product comprising clear sodium silicate solution having an SiO$_2$:Na$_2$O weight ratio of about 1–2.8:1, from an upper section of said gravity thickener.

2. The apparatus of claim 1 wherein said means for introducing a sand suspension comprises: a suspending unit having stirring means, a sand introduction inlet, a suspending liquid introduction inlet and a sand suspension outlet; and a sand suspension conduit with a sand suspension pump operatively connected thereto connecting said outlet to said jet loop mixer.

3. The apparatus of claim 1 wherein said means for introducing steam comprises: a steam conduit, a steam regulator valve through which said steam conduit passes, a temperature sensor located within a middle section of said gravity thickner, and a temperature regulator operatively connected to both said temperature sensor and said steam regulator valve.

4. The apparatus of claim 1 wherein said means for introducing steam comprises: a steam conduit, a manometer located within an upper section of said gravity thickener, and a pressure release valve operatively connected to said manometer.

5. The apparatus of claim 1 wherein said means for introducing an aqueous sodium hydroxide solution comprises a sodium hydroxide conduit whose outlet is directly connected to a side of said jet loop mixer, and which has a sodium hydroxide pump operatively connected therewith.

6. The apparatus of claim 1 wherein said means for introducing deionized water comprises a deionized water conduit whose outlet is directly connected to a side of said jet loop mixer, and which has a deionized water pump operatively connected therewith.

7. The apparatus of claim 1 wherein said means for removing a completed reaction product comprises cooling means, an outlet pipe leading from said gravity thickener through said cooling means, means for conveying heat removed by said cooling means to at least one starting component, and means for filtering entrained solids, located downstream of said cooling means.

8. The apparatus of claim 7 wherein said means for removing a partial reaction product comprises a recirculation conduit whose inlet is connected to said gravity thickener below said outlet pipe, whose outlet is said at least one first nozzle, and which has a recirculation pump operatively connnected therewith.

9. The apparatus of claim 8 wherein said means for introducing an aqueous sodium hydroxide solution comprises a sodium hydroxide conduit whose outlet is connected to said recirculation conduit downstream of said recirculation pump, and which has a sodium hydroxide pump operatively connected therewith.

10. The apparatus of claim 7 wherein means for maintaining a constant reaction mass within said reactor are located within said gravity thickener, and comprise a lever governor operatively connected to said means for removing.

11. The apparatus of claim 8 wherein said means for introducing deionized water comprises a deionized water conduit whose outlet is connected to said recirculation conduit downstream of said recirculation pump, and which has a deionized water pump operatively connected therewith.

12. The apparatus of claim 1 further comprising at least one second power jet nozzle, which nozzle is positioned below said jet loop mixer at a point where its flow is directed tangentially through a lower side of said jet loop mixer parallel to its bottom end, to form a circular flow pattern within said jet loop mixer.

13. The apparatus of claim 12 wherein:
   (a) said means for introducing a sand suspension comprises: a suspending unit having stirring means, a sand introduction inlet, a suspending liquid introduction inlet and a sand suspension outlet; and a sand suspension conduit with a sand suspension pump operatively connected therewith joining said suspending unit to said jet loop mixer;
   (b) said means for removing a completed reaction product comprises cooling means, an outlet pipe leading from said gravity thickener through said cooling means, means for conveying heat removed by said cooling means to at least one starting component, and means for filtering entrained solids, located downstream of said cooling means;
   (c) means for maintaining a constant reaction mass within said reactor are located within said gravity thickener, and comprise a level governor operatively connected to said means for removing; and
   (d) said means for removing a partial reaction product comprises a recirculation conduit whose inlet is connected to said gravity thickener below said outlet pipe, whose outlet is said at least one first nozzle, and which has a recirculation pump operatively associated therewith.

14. The apparatus of claim 13 wherein said means for introducing an aqueous sodium hydroxide solution comprises a sodium hydroxide conduit whose outlet is directly connected to a side of said jet loop mixer, and which has a sodium hydroxide pump operatively associated therewith.

15. The apparatus of claim 14 wherein said means for introducing deionized water comprises a deionized water conduit whose outlet is directly connected to a side of said jet loop mixer, and which has a deionized water pump operatively connected therewith.

16. The apparatus of claim 15 wherein said means for introducing steam comprises: a steam conduit, a steam regulatory valve through which said steam conduit passes, a temperature sensor located within a middle section of said gravity thickener, and a temperature regulator operatively connected to both said temperature sensor and said steam regulatory valve.

17. The apparatus of claim 15 wherein said means for introducing steam comprises: a steam conduit, a manometer located within an upper section of said gravity thickener, and a pressure release valve operatively connected to said manometer.

18. The apparatus of claim 13 wherein said means for introducing an aqueous sodium hydroxide solution comprises a sodium hydroxide conduit whose outlet is connected to said recirculation conduit downstream of said recirculation pump; and which has a sodium hydroxide pump operatively connected therewith.

19. The apparatus of claim 18 wherein said means for introducing deionized water comprises a deionized water conduit whose outlet is connected to said recirculation conduit downstream of said recirculation pump, and which has a deionized water pump operatively connected therewith.

20. The apparatus of claim 19 wherein said means for introducing steam comprises: a steam conduit, a steam regulatory valve through which said steam conduit passes, a temperature sensor located within a middle section of said gravity thickener, and a temperature regulator operatively connected to both said temperature sensor and said steam regulatory valve.

21. The apparatus of claim 19 wherein said means for introducing steam comprises: a steam conduit, a manometer located within an upper section of said gravity thickener, and a pressure release valve operatively connected to said manometer.

* * * * *